(12) United States Patent
McCormick et al.

(10) Patent No.: US 12,703,453 B2
(45) Date of Patent: Aug. 11, 2026

(54) FORK ARCH

(71) Applicant: Fox Factory, Inc., Duluth, GA (US)

(72) Inventors: Daniel McCormick, Mills River, NC (US); Bryan Wesley Anderson, Horse Shoe, NC (US); Joshua Coaplen, Asheville, NC (US)

(73) Assignee: Fox Factory, Inc., Duluth, GA (US)

( * ) Notice: Subject to any disclaimer, the term of this patent is extended or adjusted under 35 U.S.C. 154(b) by 391 days.

(21) Appl. No.: 18/381,122

(22) Filed: Oct. 17, 2023

(65) Prior Publication Data

US 2024/0132178 A1 Apr. 25, 2024
US 2024/0227978 A9 Jul. 11, 2024

Related U.S. Application Data

(60) Provisional application No. 63/417,610, filed on Oct. 19, 2022.

(51) Int. Cl.
*B62K 25/08* (2006.01)

(52) U.S. Cl.
CPC .................................... *B62K 25/08* (2013.01)

(58) Field of Classification Search
CPC ......... B62K 21/02; B62K 25/08; B62K 21/04
See application file for complete search history.

(56) References Cited

U.S. PATENT DOCUMENTS 5,653,007 A * 8/1997 Boyer ....................... B62L 1/02
29/525.01
6,607,185 B2 8/2003 Graves et al.
7,484,603 B2 2/2009 Fox
7,621,549 B2 11/2009 Van Houweling
8,104,782 B2 1/2012 Achenbach et al.
8,196,947 B2 6/2012 Achenbach et al.
8,678,415 B2 3/2014 Lude et al.
8,838,335 B2 9/2014 Bass et al.
8,955,653 B2 2/2015 Marking
9,027,947 B2 5/2015 Galasso et al.
9,303,712 B2 4/2016 Cox
9,669,892 B2 * 6/2017 Galasso ................. B62K 21/02
9,975,595 B2 5/2018 Galasso et al.
10,036,443 B2 7/2018 Galasso et al.
10,060,499 B2 8/2018 Ericksen et al.
10,443,671 B2 10/2019 Marking
10,737,546 B2 8/2020 Tong
10,850,793 B2 12/2020 Galasso
(Continued)

FOREIGN PATENT DOCUMENTS

EP 2181918 A2 5/2010
EP 4068135 A1 10/2022
WO 2009030412 A1 3/2009

OTHER PUBLICATIONS

European Extended Search Report for European Application No. 23204503.9, 7 Pages, Mailed Feb. 23, 2024.

*Primary Examiner* — Minnah L Seoh
*Assistant Examiner* — Hosam Shabara

(57) ABSTRACT

A fork arch is disclosed. The fork arch includes a torsional geometry portion to provide torsional stiffness. The fork arch also includes a transverse geometry portion to provide transverse shear stiffness, the transverse geometry portion intermingled with the torsional geometry portion to provide an optimized hybrid torsion and transverse shear stiffness for the fork arch.

10 Claims, 8 Drawing Sheets

(56) References Cited

U.S. PATENT DOCUMENTS

| | | | | |
|---|---|---|---|---|
| 12,437,127 | B2 * | 10/2025 | Coaplen | G06F 30/23 |
| 2003/0071400 | A1 * | 4/2003 | Graves | B62K 25/08 267/140.11 |
| 2008/0023934 | A1 * | 1/2008 | van Houweling | B62J 6/029 280/276 |
| 2009/0243251 | A1 * | 10/2009 | Galasso | B62K 21/02 280/279 |
| 2010/0102530 | A1 * | 4/2010 | Achenbach | B62K 25/08 280/276 |
| 2010/0164200 | A1 * | 7/2010 | Lude | B62K 21/02 280/276 |
| 2014/0145413 | A1 * | 5/2014 | Baltaxe | B62K 25/08 280/279 |
| 2014/0191491 | A1 * | 7/2014 | Lude | F16F 9/0236 280/276 |
| 2017/0320535 | A1 | 11/2017 | Galasso | |

* cited by examiner

FORK ARCH

CROSS-REFERENCE TO RELATED APPLICATIONS (PROVISIONAL)

This application claims priority to and benefit of co-pending U.S. Provisional Patent Application No. 63/417,610 filed on Oct. 19, 2022, entitled "OPTIMIZED FORK ARCH TO MAXIMIZE TORSION AND TRANSVERSE SHEAR STIFFNESS" by McCormick et al., and assigned to the assignee of the present application, the disclosure of which is hereby incorporated by reference in its entirety.

FIELD OF THE INVENTION

Embodiments of the invention generally relate to the field of vehicle frames, support members, and the like.

BACKGROUND OF THE INVENTION

Vehicle components, frames, members, suspension systems, and the like, must resist forces tending to twist and/or bend those structures. Further, it is desirable that such structures be maintained in position relative to one another. That often means that the structures and/or their connection to one another need to be suitably reinforced. As such, these structures are manufactured to meet a number of structural integrity requirements. These requirements can include the ability to support a structural load (e.g., a weight, force, etc.) without breaking or failing.

Figure 1:
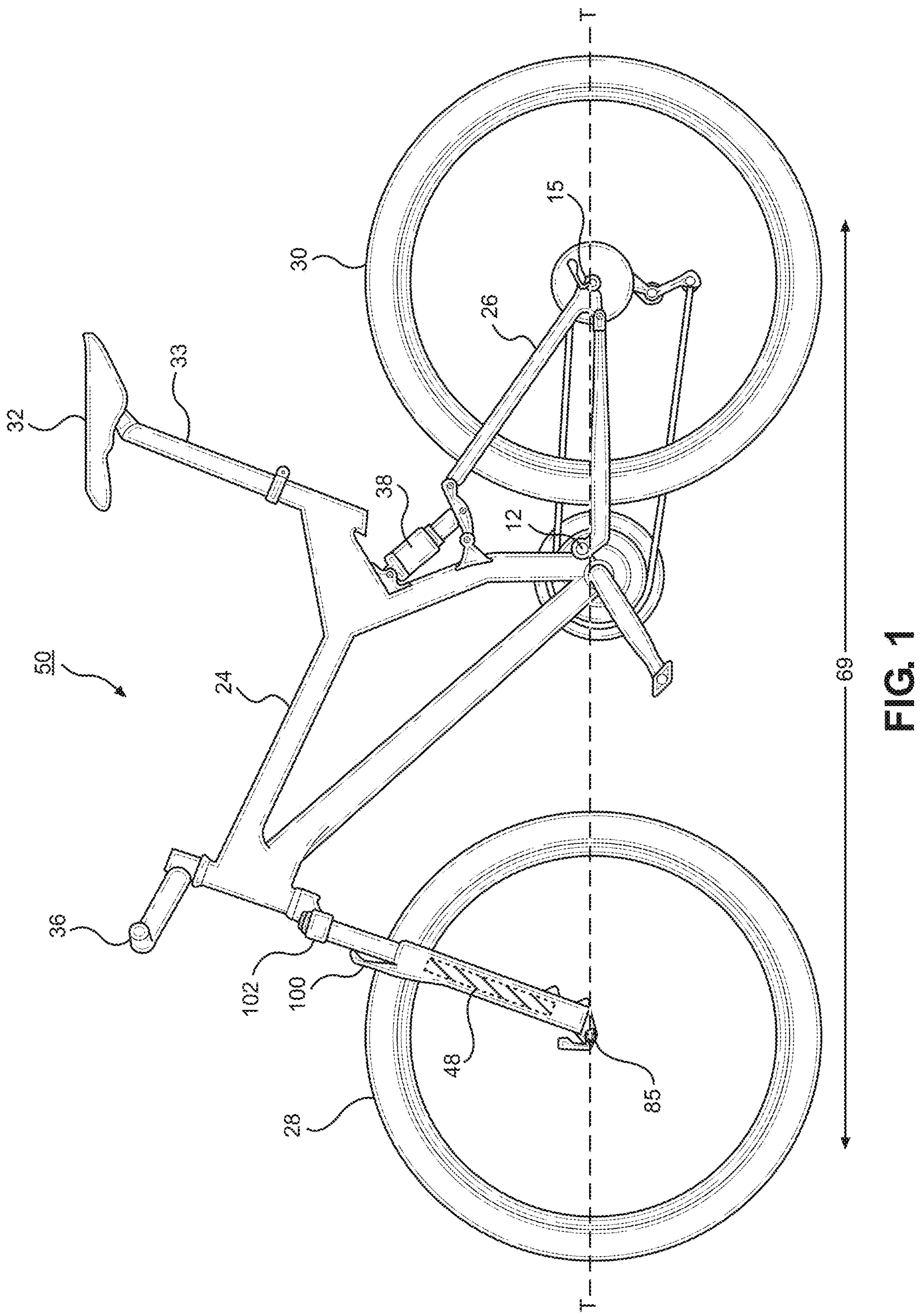
FIG. 1 is a perspective view of a bicycle with at least one fork arch, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In the following discussion, and for purposes of clarity, a bicycle is utilized as the example vehicle. However, in another embodiment, the vehicle could be one any one of a variety of vehicles such as, but not limited to, a bicycle, a motorized bicycle, or the like. In general, a motorized bike can include a bike with a combustion motor, an electric motor (e-bike), a hybrid electric and combustion bike, a hybrid motor and pedal powered bike, and the like.

Often, bicycle components are designed with a large performance window to cover a broad scope of consumers and ride types. For example, a mountain bike sold at a shop may be designed with components manufactured to meet the needs of intermediate level riders with a body weight between 120-180 lbs. (for example). As such, a bike shop would be able to use the weight criteria to help guide the customer in the purchase of an appropriate bike with an appropriate level of component performance.

However, as the rider advances in skill, the performance requirements of one or more components of the bike will likely need to be upgraded. These upgrades can include aspects such as stronger structures, lighter structures, etc. Moreover, depending upon the type of bike and the type of terrain, features, jumps, bumps, performance expectations, and the like, there may be a need to only upgrade one or some components. In some extreme performance cases, there may be a desire to find even a very small weight and/or strength advantage that would allow the rider to be just a bit faster, jump a bit higher, gain just a bit of top end speed, etc. than a fellow competitor.

In one embodiment, the fork arch disclosed herein utilizes a first geometric feature to optimize torsional stiffness. In one embodiment, the fork arch disclosed herein utilizes a second geometric feature to optimize transverse shear stiffness. In one embodiment, the fork arch disclosed herein utilizes a combination of both the first geometric feature to optimize torsional stiffness and the second geometric feature to optimize transverse shear stiffness.

In one embodiment, the fork arch disclosed herein utilizes a one or more material removal regions to reduce the weight of the fork arch. In one embodiment, the material removal regions are off plane. In one embodiment, the material removal regions are in low stress areas. In one embodiment, the material removal regions are both off plane and in low stress areas.

In one embodiment, the material removal regions are areas where the material is partially removed from the fork arch but there is still some material remaining (e.g., not a hole, window, etc.). In one embodiment, the material removal regions are areas where the material is completely removed from the fork arch, e.g., a hole, window, etc.). In one embodiment, the material removal regions are a combination of areas some of which having the material partially removed and some of which having the material completely removed.

For purposes of clarity, the discussion herein refers to a "fork arch" as that is the term of reference in the art. In one embodiment, the fork arch includes somewhat of an arch.

However, in another embodiment, the fork arch will have another type of geometric shape such as a triangle, rectangle, star, or the like. In one embodiment, the fork arch is a hybrid type of geometric shape that incorporates a number of different geometric shapes such as an arch, triangle, rectangle, star, square, and the like.

Referring now to FIG. 1, a schematic side view of a bicycle 50 having an optimized fork arch 100 incorporated therewith is shown in accordance with an embodiment. In one embodiment, bicycle 50 has a frame 24 with a suspension system comprising a swing arm 26 that, in use, is able to move relative to the rest of frame 24; this movement is permitted by, inter alia, damper 38. The front fork assembly 102 also provide a suspension function via a damper 48 in at least one fork leg; as such the bicycle 50 is a full suspension bicycle (such as an ATB or mountain bike).

However, the embodiments described herein are not limited to use on full suspension bicycles. In particular, the term "suspension system" is intended to include vehicles having front suspension only, rear suspension only, seat suspension only, a combination of two or more different suspension types, and the like.

In one embodiment, swing arm 26 is pivotally attached to the frame 24 at pivot point 12. Although pivot point 12 is shown in a specific location, it should be appreciated that pivot point 12 can be found at a different location. In a hard tail bicycle embodiment, there would be no pivot point 12. In one embodiment of a hardtail bicycle, frame 24 and swing arm 26 would be formed as a fixed frame.

Bicycle 50 includes a front wheel 28 which is coupled with the front fork assembly 102 via front axle 85. In one embodiment, a portion of front fork assembly 102 (e.g., a steerer tube) passes through the bicycle frame 24 and couples with handlebars 36. In so doing, the front fork assembly and handlebars are rotationally coupled with the frame 24 thereby allowing the rider to steer the bicycle 50.

Bicycle 50 includes a rear wheel 30 which is coupled to the swing arm 26 at rear axle 15, and a rear damping assembly (e.g., damper 38) is positioned between the swing arm 26 and the frame 24 to provide resistance to the pivoting motion of the swing arm 26 about pivot point 12. In one embodiment, a saddle 32 is connected to the frame 24 via a seatpost 33. In one embodiment, seatpost 33 is a dropper seatpost.

In one embodiment, one or more of damper 48, damper 38, seatpost 33, handlebars 36, and/or the like include one or more active damping components. In one embodiment, one or more sensors and valve actuators (e.g. electric solenoid or linear motor type—note that a rotary motor may also be used with a rotary actuated valve), suspension components, suspension component controller(s) and/or data processing system(s), and the like may be coupled to and/or integrated with the vehicle structure, such as disclosed in U.S. Pat. Nos. 7,484,603; 8,838,335; 8,955,653; 9,303,712; 10,036,443; 10,060,499; 10,443,671; and 10,737,546; the content of which is incorporated by reference herein, in their entirety. Further, sensors and valves, or principles, of patents and other documents incorporated herein by reference, may be integrated one or more embodiments hereof, individually or in combination.

For purposes of the following discussion, longitudinal direction 69 is the direction of the forward end to the rear end of the bicycle 50.

A ground plane refers to the plane that is formed by the terrain across which the vehicle is traveling. The ground plane would encompass the line formed by arrow 69. In an upright position, bicycle 50 would be perpendicular (or substantially perpendicular) to the ground plane.

A vertical central plane A-A (as shown at least in FIG. 4B) bisects the length of bicycle 50 (e.g., from the front of the bicycle 50 through the rear of bicycle 50—along the same line formed by arrow 69) when the bicycle 50 in an upright position such that the vertical central plane A-A is perpendicular to the ground plane.

A transverse direction 93 (as shown at least in FIG. 4B) is perpendicular (or substantially perpendicular) to vertical central plane A-A.

Plane T-T of FIG. 1 is parallel to (or substantially parallel to) the ground plane and contains the axis of rotation of front wheel 28 and rear wheel 30.

Figure 2A:
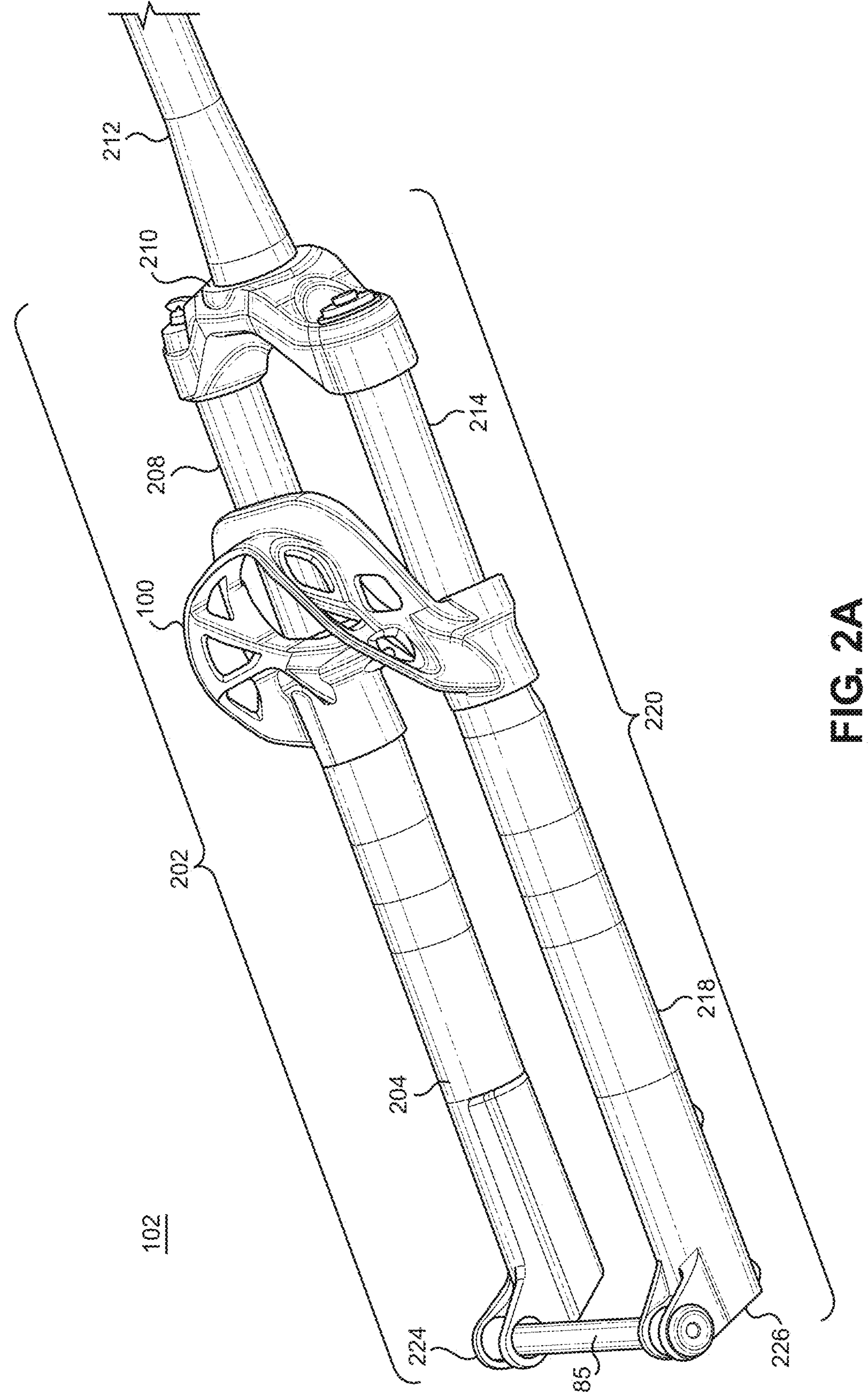
FIG. 2A is a perspective view of a front fork assembly having at least one fork arch incorporated at a front of the fork, in accordance with one embodiment.

Referring now to FIG. 2A, a perspective view of the front fork assembly 102 (of FIG. 1), having at least one fork arch 100 incorporated at a front thereof, is shown in accordance with an embodiment. The front fork assembly 102 include right and left legs, 202 and 220, respectively, as referenced by a person in a riding position on the bicycle 50. The right leg 202 includes a right upper tube 208 telescopingly received in a right lower tube 204. Similarly, the left leg 220 includes a left upper tube 214 telescopingly received in a left lower tube 218.

In one embodiment, the telescoping of the legs is inverted. That is, the right lower tube 204 of right leg 202 is telescopingly received in the right upper tube 208. Similarly, the left lower tube 218 of left leg 220 is telescopingly received in the left upper tube 214.

A crown 210 connects the right upper tube 208 to the left upper tube 214 thereby connecting the right leg 202 to the left leg 220 of the front fork assembly 102. In addition, the crown 210 supports a steerer tube 212, which passes through, and is rotatably supported by, the frame 24 of the bicycle 50. The steerer tube 212 provides a means for connection of the handlebars 36 to the front fork assembly 102.

Each of the right lower tube 204 and the left lower tube 218 includes dropouts 224 and 226, respectively, for connecting the front wheel 28 to the front fork assembly 102 via a front axle 85. In one embodiment, fork arch 100 connects the right lower tube 204 and the left lower tube 218 to provide strength and minimize twisting thereof.

In one embodiment, fork arch 100 is facing forward, e.g., toward the front wheel 28 of FIG. 1.

Figure 2B:
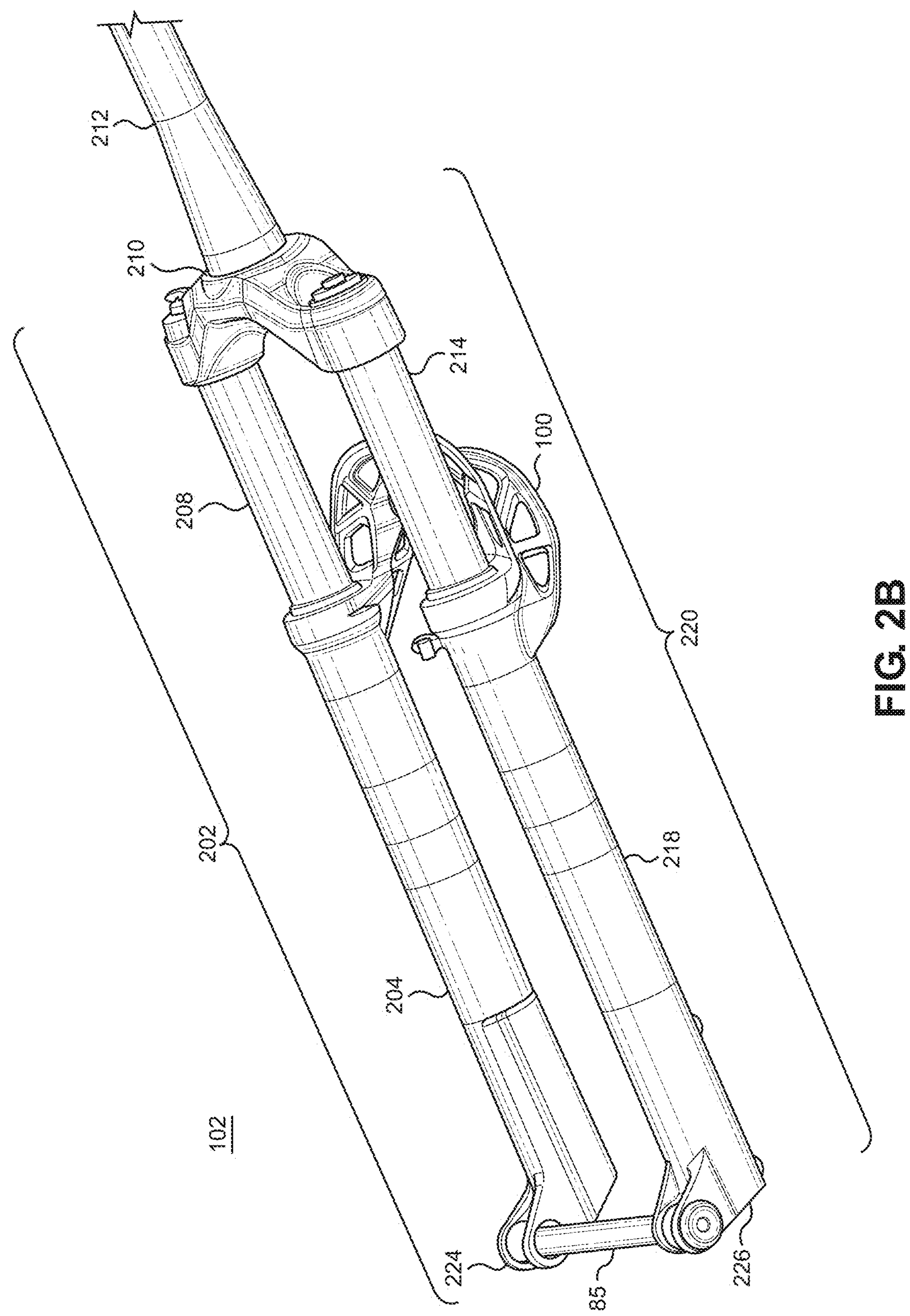
FIG. 2B is a perspective view of a front fork assembly having at least one fork arch incorporated at a back of the fork, in accordance with one embodiment.

Referring now to FIG. 2B, a perspective view of a front fork assembly 102 having at least one fork arch 100 incorporated at a back thereof is shown in accordance with one embodiment. In one embodiment, the components of FIGS. 2A and 2B are similar except where they are modified based upon the reverse configuration of fork arch 100. As such, the discussion of the similar components is not repeated for purposes of clarity, instead, the discussion of FIG. 2A is incorporated herein by reference in its entirety.

In one embodiment, fork arch 100 is facing rearward, e.g., toward the rear wheel 30 of FIG. 1.

Figure 2C:
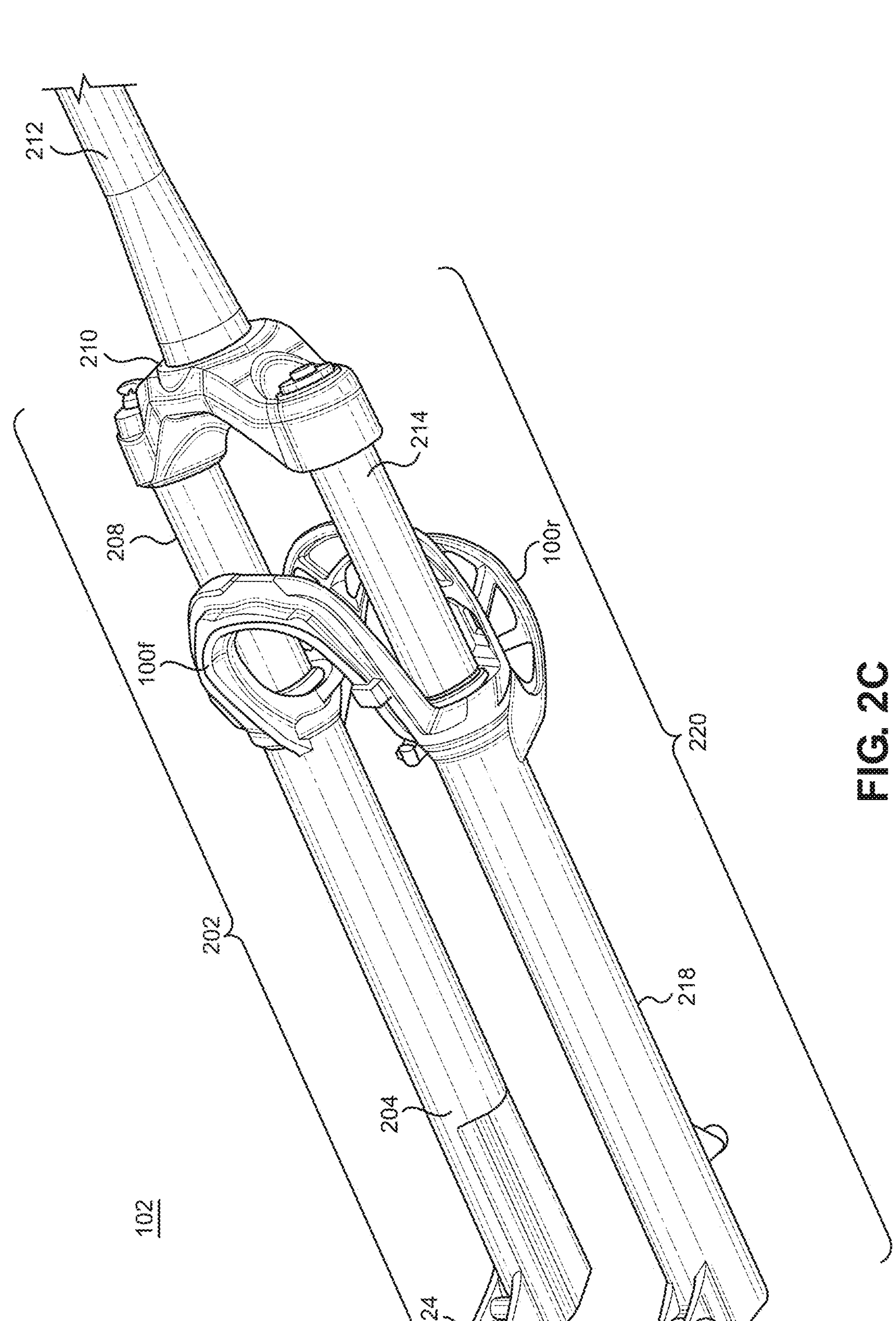
FIG. 2C is a perspective view of a front fork assembly having at least one fork arch incorporated at a front of the fork and at least one fork arch incorporated at a back of the fork, in accordance with one embodiment.

With reference now to FIG. 2C, a perspective view of a front fork assembly 102 having at least one fork arch *100f* incorporated at a front of the front fork assembly 102 and at least one fork arch *100r* incorporated at a back of the front fork assembly 102 is shown in accordance with one embodiment. In one embodiment, the components of FIGS. 2A and 2C are similar except where they are modified based upon the front and rear locations of the fork arches. As such, the discussion of the similar components is not repeated for purposes of clarity, instead, the discussion of FIG. 2A is incorporated herein by reference in its entirety.

In one embodiment, each of fork arch **100*r* and fork arch 100*f*** utilize one and/or a combination of both the first geometric feature to optimize torsional stiffness and the second geometric feature to optimize transverse shear stiffness as described in further detail herein.

In one embodiment, fork arch **100*r* utilizes the first geometric feature to optimize torsional stiffness and fork arch 100*f*** utilizes the second geometric feature to optimize transverse shear stiffness as described in further detail herein.

In one embodiment, fork arch **100*r* utilizes the second geometric feature to optimize transverse shear stiffness and fork arch 100*f*** utilizes the first geometric feature to optimize torsional stiffness as described in further detail herein.

In one embodiment, one of fork arch **100*r* and fork arch 100*f* utilize one and/or a combination of both the first geometric feature to optimize torsional stiffness and the second geometric feature to optimize transverse shear stiffness as described in further detail herein; while the other of fork arch 100*r* and fork arch 100*f*** is a standard fork arch.

In one embodiment, one or both of fork arch **100*r* and fork arch 100*f*** utilize one or more material removal regions as described in further detail herein.

Figure 3:
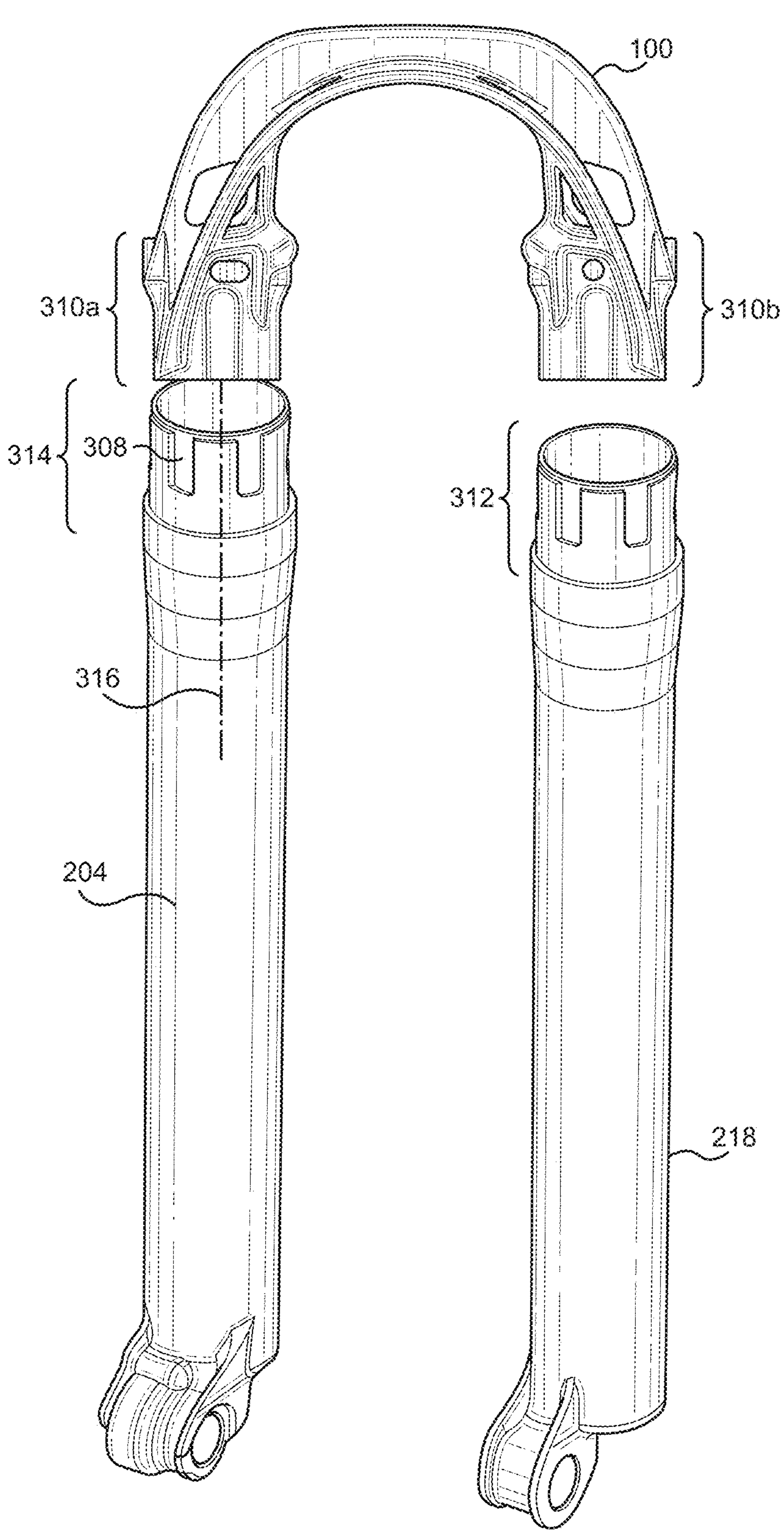
FIG. 3 is an exploded view of the fork arch design, a right lower tube and a left lower tube, in accordance with one embodiment.

With reference now to FIG. 3, an exploded view of the fork arch 100, a right lower tube 204 and left lower tube 218 are shown in accordance with one embodiment.

In the following discussion of FIGS. 3-4E, although in one embodiment, the fork arch 100 is coupleable to a front fork assembly 102 in an inverted orientation, for purposes of clarity, in FIGS. 3-4E, the fork arch 100 will be coupled to a front fork assembly 102 in a standard telescoping configuration.

Figure 4A:
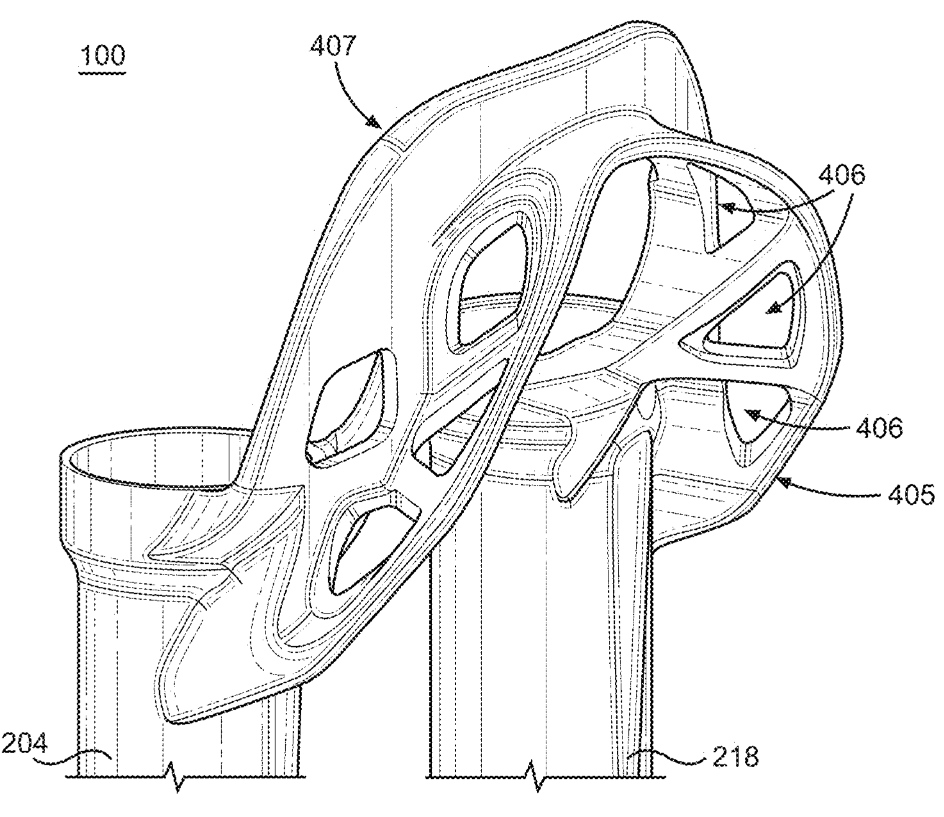
FIG. 4A is an orthogonal perspective view of the fork arch showing a number of components incorporated therewith, in accordance with one embodiment.
Figure 4B:
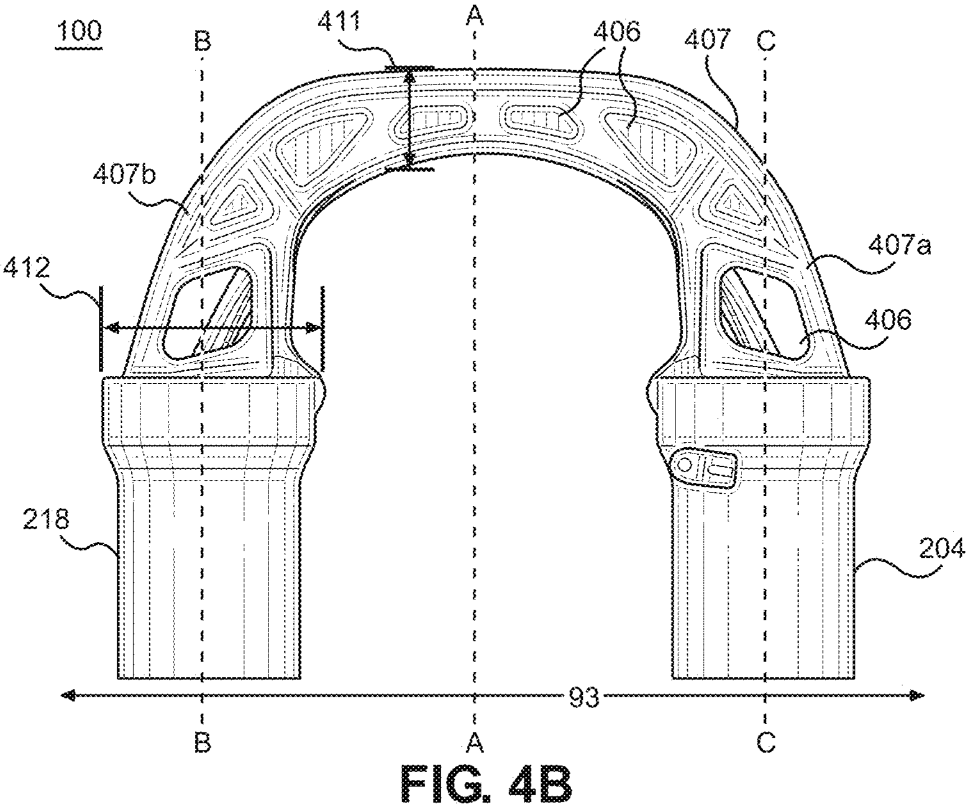
FIG. 4B is a rear perspective view of the fork arch showing a number of components incorporated therewith, in accordance with one embodiment.
Figure 4C:
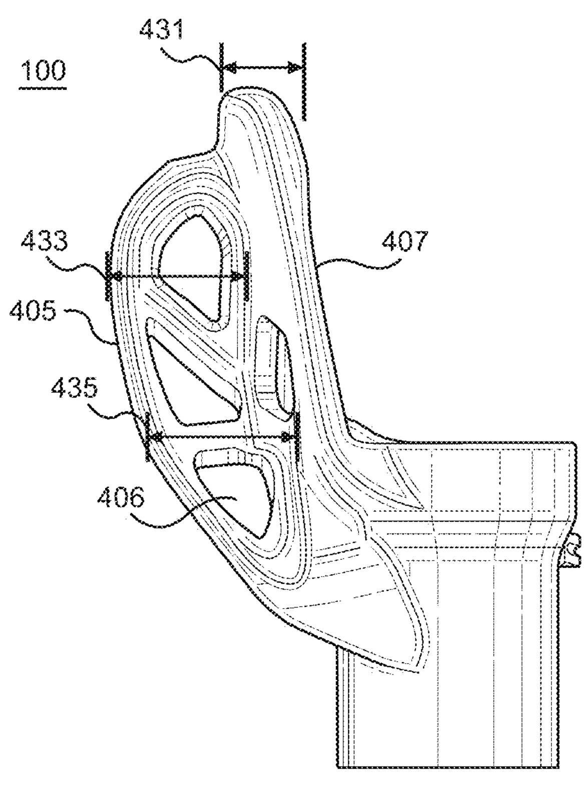
FIG. 4C is a side perspective view of fork arch showing a number of components incorporated therewith, in accordance with one embodiment.
Figure 4D:
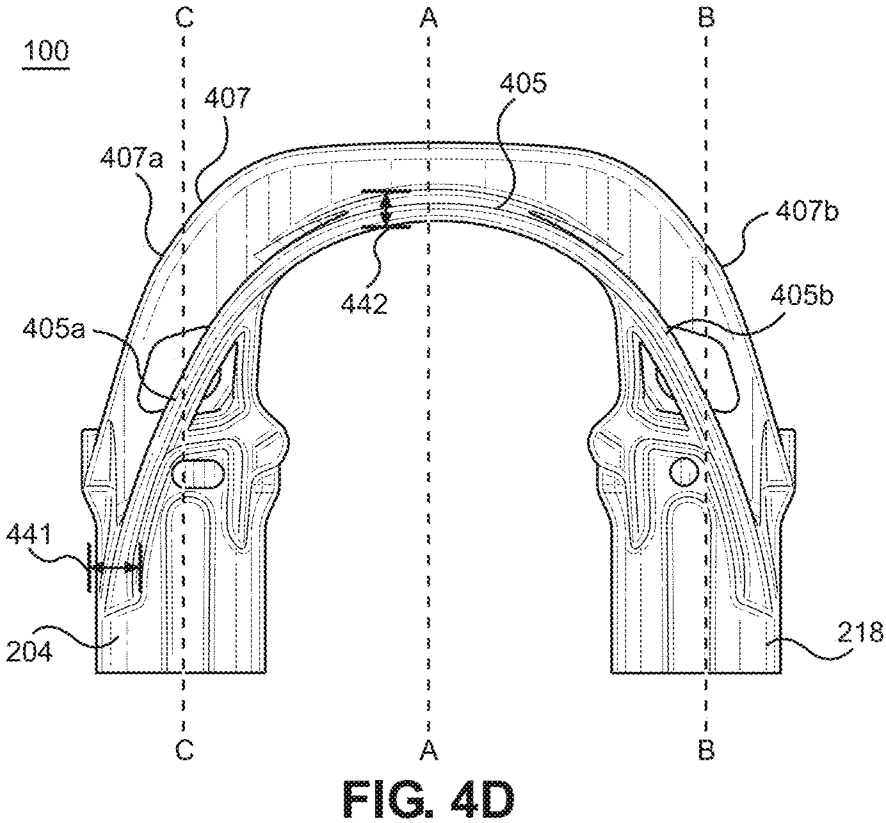
FIG. 4D is a front perspective view of the fork arch showing a number of components incorporated therewith, in accordance with one embodiment.
Figure 4E:
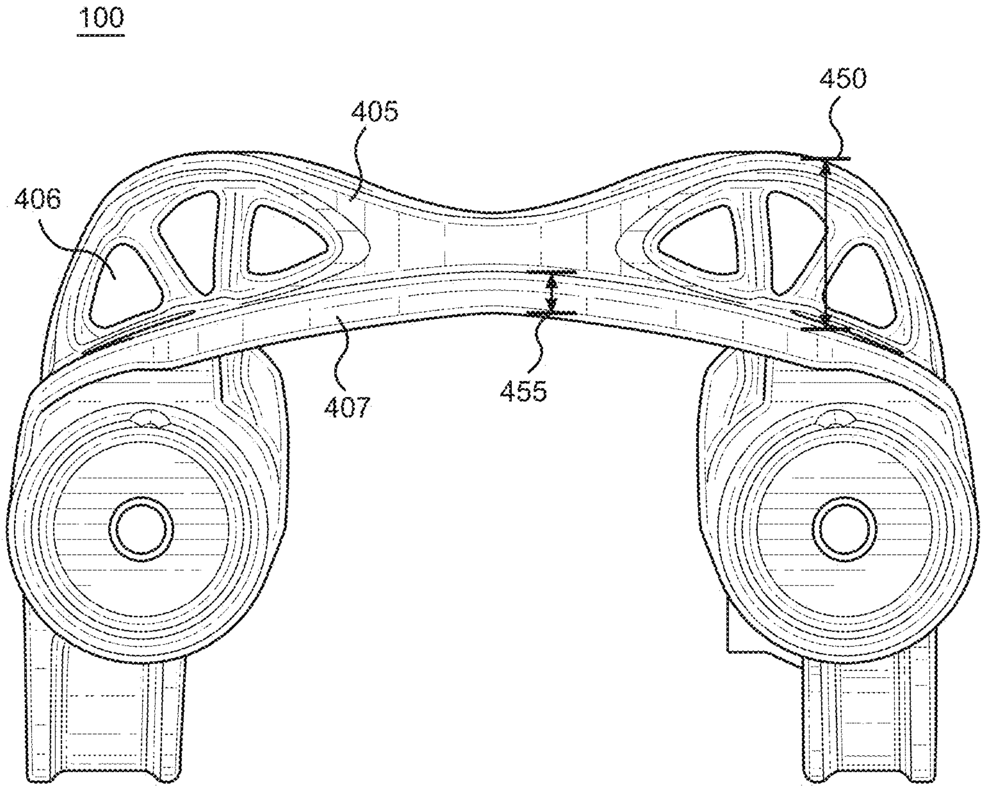
FIG. 4E is a perspective top view of the fork arch, in accordance with one embodiment.

Similarly, as discussed herein, although in different embodiments, the fork arch 100 is coupleable to a front fork assembly 102 in front of the steering axis (as shown in FIG. 2A), behind the steering axis (as shown in FIG. 2B), or both in front and behind the steering axis (as shown in FIG. 2C), for purposes of clarity, in FIGS. 3-4E, the fork arch 100 will be shown as being coupled in front of the front fork assembly 102.

In one embodiment, fork arch 100 is coupled with right lower tube 204 and left lower tube 218. In an inverted fork embodiment, the fork arch 100 would be coupled with right upper tube 208 and left upper tube 214.

In one embodiment, fork arch 100 is used for coupling the fork legs together at a second location offset from the crown. In one embodiment, fork arch 100 provides improved alignment of the left and right fork legs of a bicycle by allowing for mid-assembly horizontal, vertical and rotational adjustment of the fork legs via the fork arch 100.

In one embodiment, the fork arch 100, the right lower tube 204 and left lower tube 218 are manufactured as a single piece. In one embodiment, the fork arch 100 is formed separately from the fork legs, and/or of a different material. In other words, the fork arch 100, is manufactured separately from the right lower tube 204 and left lower tube 218. In one embodiment, the fork arch 100 is formed with at least one lower tube as a single piece. In one embodiment, the second lower tube is attached afterward, e.g., during assembly.

In one embodiment, the fork arch 100 and/or the lower fork legs are made of castable material like magnesium, aluminum or titanium. In one embodiment, the fork arch 100 and/or the lower fork legs are made of fiber reinforced polymer (e.g. carbon and/or glass reinforced epoxy or PEEK or other polyarylenes) or any other suitable structural material providing a suitably high level of strength, stiffness and impact resistance or any suitable combination thereof.

Further discussion of the operation and performance of a fork arch of a fork assembly can be found in U.S. Pat. No. 9,975,595, which is incorporated by reference herein, in its entirety.

In one embodiment, during assembly, the separate pieces may be individually adjusted to attain a desired alignment relative to each other. When properly aligned, the telescopic movement of the upper tubes within the lower tubes remains near or at the lowest friction level. Once the lower fork legs are positionally adjusted such that the lower fork legs are aligned within the same horizontal and vertical planes, then embodiments enable the stabilization of these adjusted positions through attachment features found in both the fork arch 100 and the lower fork legs (e.g., bolt holes, screw holes, glue cavities, etc.).

In one embodiment, if the components are manufactured as separate pieces, they may be fixedly coupled during assembly using a number of methods such as, but not limited to, the fork arch 100 being coupled with the lower fork legs using horizontal and vertical attachment bars; the fork arch 100 being coupled with lower fork legs using a matching positive and negative spline features and then glued, screwed, bolted, or otherwise fixedly coupled onto lower fork legs.

In one embodiment, the right lower tube 204 has a first end 314 and the left lower tube 218 has a second end 312. In one embodiment, the first end 314 and second end 312 include a set of negative splines 308. A set of negative splines 308 is a depression formed therein. In one embodiment, the fork arch 100 includes the right fork arch shoulder 310A and the left fork arch shoulder 310B. The inner surfaces (not shown) of the right fork arch shoulder 310A and the left fork arch shoulder 310B includes a set of positive splines configured for fitting within the set of negative splines 308. A set of positive splines is a raised vertically shaped block and is formed such that the raised positive spline fits within the negative spline depression.

In one embodiment, the raised positive splines are smaller in area than the negative spline depressions, such that when the right fork arch shoulder 310A and the left fork arch shoulder 310B are placed over the first end 314 and the second end 312 of the right lower tube 204 and the left lower tube 218, respectively, the right lower tube 204 and the left lower tube 218 may be rotated horizontally, vertically and rotationally within the fixture prior to a more permanent attachment mechanism being applied, such as, for example, glue.

Further discussion of the different methods and systems for coupling fork arch 100 with right lower tube 204 and left lower tube 218 can be found in U.S. Pat. No. 10,850,793 which is incorporated by reference herein, in its entirety.

With reference now to FIG. 4A, an orthogonal perspective view of the fork arch 100 showing a number of components incorporated therewith is shown in accordance with one embodiment.

In one embodiment, fork arch 100 includes a first geometric feature, e.g., torsional geometry 405 to optimize torsional stiffness. In general, torsional stiffness deals with torsional loads. Basically, if front wheel 28 of bicycle 50 is in a bike rack (e.g., such that the front wheel is incapable of turning left or right) and a force is provided as an attempt to turn the handlebars 36, a torsional load would be imparted on the front fork assembly 102. Thus, in an operational example, when the bike is turning (or otherwise leaning to the side), torsion occurs because the contact point of the front fork assembly 102 is not in line with the axis of the front fork assembly 102. Using a tire envelope curvature, for example, the torsion brow would follow the circumference of the tire.

In one embodiment, torsional geometry 405 is somewhat of an arch. In one embodiment, torsional geometry 405 is another type of geometric shape such as a triangle, rectangle, star, or the like. In one embodiment, torsional geometry 405 is a hybrid type of geometric shape that incorporates a number of different geometric shapes such as an arch, triangle, rectangle, star, square, and the like.

In one embodiment, the torsional geometry 405 extends upwardly (or biased upwardly) from plane T-T, and at least a portion of the torsional geometry 405 extends in the transverse direction 93 of bicycle 50. In one embodiment, a portion of the torsional geometry 405 also extends upwardly (or biased upwardly) from plane T-T in the longitudinal direction 69 of bicycle 50. In one embodiment, a majority of the torsional geometry 405 extends in the longitudinal direction 69 of bicycle 50.

In one embodiment, fork arch 100 includes a second geometric feature, e.g., transverse geometry 407 to optimize transverse shear stiffness. Transverse shear stiffness refers to the stiffness in the fork arch 100 with respect to different up and/or down movement of the two fork legs. For example, transverse shear occurs when right lower tube 204 receives a given upward force while lower tube 218 does not receive the same upward force. Once again using the tire envelope curvature, for example, the transverse sheer would be radially outward from the envelope of the tire.

In one embodiment, transverse geometry 407 is somewhat of an arch. In one embodiment, transverse geometry 407 is another type of geometric shape such as a triangle, rectangle, star, or the like. In one embodiment, transverse geometry 407 is a hybrid type of geometric shape that incorporates a number of different geometric shapes such as an arch, triangle, rectangle, star, square, and the like.

In one embodiment, the transverse geometry 407 extends upwardly (or biased upwardly) from plane T-T. In one embodiment, at least a portion of the transverse geometry 407 extends in the longitudinal direction 69.

In one embodiment, a majority of the transverse geometry 407 extends upwardly (or biased upwardly) from plane T-T in the transverse direction 93.

In one embodiment, fork arch 100 utilizes a combination (or intermingling, etc.) of both torsional geometry 405 and transverse geometry 407 to provide a hybrid optimization of both torsional stiffness and transverse shear stiffness. E.g., an optimized hybrid torsion and transverse shear stiffness for the fork arch 100. In one embodiment, torsional geometry 405 and transverse geometry 407 utilize different geometric shapes. In one embodiment, torsional geometry 405 and transverse geometry 407 utilize similar geometric shapes.

In one embodiment, transverse geometry 407 is located at an angle with respect to torsional geometry 405. In one embodiment, torsional geometry 405 is integrally formed with transverse geometry 407 during manufacture. In one embodiment, torsional geometry 405 is formed separately and coupled with transverse geometry 407 during manufacture.

In one embodiment, fork arch 100 utilizes one or more material removal regions 406 to reduce the weight of the fork arch 100. In one embodiment, one or more material removal regions 406 are a thinning (e.g., a depression, a protrusion, a groove, and the like), an opening, a combination thereof, and the like. In one embodiment, the material removal regions 406 are in low stress areas.

In one embodiment, the material removal regions 406 are areas where the material is partially removed from the fork arch 100 but there is still some material remaining (e.g., not a hole, window, etc.). In one embodiment, the material removal regions 406 are areas where the material is completely removed from the fork arch, (e.g., a hole, window, etc.). In one embodiment, the material removal regions 406 are a combination of regions, some of which having the material partially removed and some of which having the material completely removed.

In one embodiment, transverse geometry 407 and/or torsional geometry 405 include at least one material removal region 406. In one embodiment, transverse geometry 407 includes at least eight material removal regions 406. In some embodiments, transverse geometry 407 includes less or more than eight material removal regions 406. In one embodiment, torsional geometry 405 includes at least two material removal regions 406. In some embodiments, torsional geometry 405 includes at least six material removal regions 406. In some embodiments, torsional geometry 405 includes less or more than six material removal regions 406.

In one embodiment, the fork arch 100 is a metal. In another embodiment, the fork arch 100 is a composite material. A composite material could be carbon fiber, carbon fiber short string, graphene gyroid, or the like. In one embodiment, the composite material may be in a woven fabric form, mat fabric form, may be preferentially oriented using unidirectional reinforcement manufacturing methods in anticipation of greater stresses in given orientations, or the like.

Examples of different metals could include metals such as, but not limited to aluminum, steel, titanium, magnesium, and the like.

In one embodiment, the formation of the fork arch 100 is additive, subtractive, or both additive and subtractive. Additive refers to the process of adding (or growing) material to make a part. An example of an additive process is a 3D printer, a cast, a mold, extrusion, layering, casting, etc.

Subtractive refers to the process of removing material from an existing chunk of material. An example of a subtractive process is a milling machine milling a block of material down to form a part.

With reference now to FIG. 4B, a rear perspective view of the fork arch 100 showing a number of components incorporated therewith is shown in accordance with one embodiment. In one embodiment, the components of FIG. 4B are similar to those shown and described in FIG. 4A. As such, the discussion of the similar components is not repeated for purposes of clarity, instead, the discussion of FIG. 4A is incorporated herein by reference in its entirety.

In one embodiment, the one or more material removal regions 406 are geometric shapes such as a triangles, rectangles, stars, or the like. In one embodiment, the one or more material removal regions 406 are a hybrid type of geometric shape that incorporates a number of different geometric shapes.

In one embodiment, the one or more material removal regions 406 utilize different geometric shapes. In one embodiment, the one or more material removal regions 406 utilize similar geometric shapes.

In one embodiment, some of the one or more material removal regions 406 are open through the fork arch 100 (such as shown for example at the portion of fork arch 100 closest to right lower tube 204 and left lower tube 218) while other of the one or more material removal regions 406 include only partially removed material (e.g., such as shown for example in transverse geometry 407).

However, it should be appreciated that other embodiments may have more, fewer, or different material removal regions 406. Moreover, in one embodiment the one or more material removal regions 406 would include no openings. In one embodiment, all of the one or more material removal regions 406 would include openings. In one embodiment, the one or more material removal regions 406 with openings and those without openings may be different that shown in the embodiment configuration.

The location, number, shape, and use of one or more material removal regions 406 with openings and without openings are provided herein as one embodiment and for purposes of clarity.

Referring still to FIG. 4B, a vertical central plane A-A is shown. In one embodiment, vertical central plane A-A generally bisects the length of bicycle 50 from the front of the bicycle 50 through the rear of bicycle 50. In one embodiment, fork arch 100 is shown in FIG. 4B in a transverse direction to vertical central plane A-A (e.g., such as the width of the bicycle 50).

In one embodiment, a longitudinal center axis C-C of the right lower tube 204 and a longitudinal center axis B-B of the left lower tube 218 are shown.

In one embodiment, transverse geometry 407 includes a first leg portion 407*a* and a second leg portion 407*b*. In one embodiment, first leg portion 407*a* is symmetrical with respect to second leg portion 407*b*. In one embodiment, first leg portion 407*a* is asymmetrical with respect to second leg portion 407*b*.

In one embodiment, transverse geometry 407 has a width 411 at a central area thereof and has a width 412 closest to right lower tube 204 and left lower tube 218. In one embodiment, width 411 is smaller than width 412. In another embodiment, width 411 is equal to width 412. In another embodiment, width 411 is larger than width 412.

In one embodiment, the width of the first leg portion 407*a* is variable along the length of the transverse geometry 407. In one embodiment, the width of the second leg portion 407*b* is variable along the length of the transverse geometry 407.

In one embodiment, the different widths, shapes, and one or more material removal regions 406 of transverse geometry 407 are different for different use cases as discussed in further detail herein.

Referring now to FIG. 4C, a side perspective view of fork arch 100 showing a number of components incorporated therewith is shown in accordance with one embodiment. In one embodiment, the components of FIG. 4C are similar to those shown and described in FIGS. 4B and 4A. As such, the discussion of the similar components is not repeated for purposes of clarity, instead, the discussion of FIGS. 4A and 4B is incorporated herein by reference in its entirety.

In one embodiment, transverse geometry 407 has a depth 431. In one embodiment, depth 431 is variable along the length of the transverse geometry 407.

In one embodiment, a depth of torsional geometry varies along the length of the torsional geometry 405. In one embodiment, torsional geometry 405 has an upper depth 433 and a lower depth 435. In one embodiment, upper depth 433 is larger than lower depth 435. In one embodiment, upper depth 433 is equal to lower depth 435. In one embodiment, upper depth 433 is less than lower depth 435. In one embodiment, upper depth 433 is variable along the length of the torsional geometry 405. In one embodiment, lower depth 435 is variable along the length of the torsional geometry 405.

In one embodiment, both transverse geometry 407 and torsional geometry 405 extend in transverse direction 93, but in one embodiment, the depths of 405 extend further in the longitudinal direction 69 as compared to the depths of transverse geometry 407.

With reference now to FIG. 4D, a front perspective view of the fork arch 100 showing a number of components incorporated therewith is shown in accordance with one embodiment. In one embodiment, the components of FIG. 4D are similar to those shown and described in FIGS. 4B and 4A. As such, the discussion of the similar components is not repeated for purposes of clarity, instead, the discussion of FIGS. 4A and 4B is incorporated herein by reference in its entirety.

As discussed in FIG. 4B, vertical central plane A-A, longitudinal center axis C-C of the right lower tube 204, and longitudinal center axis B-B of the left lower tube 218 are shown.

In one embodiment, transverse geometry 407 includes a first leg portion 407*a* and a second leg portion 407*b*.

In one embodiment, torsional geometry 405 includes a first leg portion 405*a* and a second leg portion 405*b*. In one embodiment, the width of the first leg portion 405*a* is variable along the length of the torsional geometry 405. In one embodiment, the width of the second leg portion 405*b* is variable along the length of the torsional geometry 405.

In one embodiment, first leg portion 405*a* is symmetrical with respect to second leg portion 405*b*. In one embodiment, first leg portion 405*a* is asymmetrical with respect to second leg portion 405*b*.

In one embodiment, torsional geometry 405 has an upper width 442 and a lower width 441. In one embodiment, upper width 442 is larger than lower width 441. In one embodiment, upper width 442 is equal to lower width 441. In one embodiment, upper width 442 is less than lower width 441.

In one embodiment, the first leg portion 407*a* is connected to an upper portion of the first lower tube 204 and the second leg portion 407*b* is connected to an upper portion of the second lower tube 218.

In one embodiment, the first leg portion 407*a* includes at least one portion connected to an upper portion of the first lower tube 204 and extended distally from the vertical central plane A-A. In one embodiment, the first leg portion 407*a* includes at least one portion connected to an upper portion of the first lower tube 204 and extended proximally to the vertical central plane A-A.

In one embodiment, the second leg portion 407*b* includes at least one portion connected to an upper portion of the second lower tube 218 and extended distally from the vertical central plane A-A. In one embodiment, the second leg portion 407*b* includes at least one portion connected to an upper portion of the second lower tube 218 and extended proximally to the vertical central plane A-A.

In one embodiment, the first leg portion 407*a* and the third leg portion 405*a* include at least one shared portion extended proximally to the vertical central plane A-A and connected with an upper portion of the first lower tube 204.

In one embodiment, the second leg portion 407*b* and the fourth leg portion 405*b* include at least one shared portion extended proximally to the vertical central plane A-A and connected with an upper portion of the second lower tube 218.

Referring now to FIG. 4E, a perspective top view of the fork arch 100 is shown in accordance with one embodiment. In one embodiment, the components of FIG. 4E are similar to those shown and described in FIGS. 4B and 4A. As such, the discussion of the similar components is not repeated for purposes of clarity, instead, the discussion of FIGS. 4A and 4B is incorporated herein by reference in its entirety.

In one embodiment, torsional geometry 405 has a depth 450. In one embodiment, transverse geometry 407 has a depth 450. In one embodiment, a one or more material removal regions 406 are shown in torsional geometry 405.

In one embodiment, the depths of the torsional geometry 405 and the transverse geometry 407 are defined when viewed substantially parallel to a plane containing the longitudinal center axes of the first lower tube (e.g., C-C through right lower tube 204) and the second lower tube (e.g., B-B through left lower tube 218).

In one embodiment, with respect to the depths (e.g., depth 431, 433, and 435) and widths (e.g., width 411, 412, 441, and 442) discussed herein, fork arch 100 has an aspect ratio (e.g., a depth-to-width ratio with respect to torsional geometry 405 and/or transverse geometry 407) that is greater than one. In one embodiment, fork arch 100 has an aspect ratio (e.g., a depth-to-width ratio with respect to torsional geometry 405 and/or transverse geometry 407) that is equal to one. In one embodiment, fork arch 100 has an aspect ratio (e.g., a depth-to-width ratio with respect to torsional geometry 405 and/or transverse geometry 407) that is less than one. In one embodiment, fork arch 100 comprises torsional geometry 405 that has an aspect ratio (a depth-to-width ratio) that is greater than 1 and transverse geometry 407 that has an aspect ratio (a depth—to width ratio) that is less than 1. In one embodiment, fork arch 100 comprises torsional geometry 405 that has at least one portion with an aspect ratio (a depth-to-width ratio) that is greater than 1 and transverse geometry 407 that has at least one portion with an aspect ratio (a depth—to width ration) that is less than 1.

Although an embodiment of a fork arch 100 with a torsional geometry 405 and transverse geometry 407 is shown herein, it is shown as one embodiment and for purposes of clarity. However, in another embodiment, different applications (e.g., different use cases, vehicles, costs, marketing, etc.) would cause the fork arch 100 to have a different torsional geometry 405 and/or transverse geometry 407 and/or the combination thereof. Moreover, different applications could result in a change in the widths, shapes, one or more material removal regions 406 of torsional geometry 405 and/or transverse geometry 407 of the fork arch 100. In one embodiment, the optimization is performed by a computer aided design (CAD) program.

Some examples of the different vehicle geometries include, but are not limited to, travel, wheel size, bike type, weight target, stiffness target, allowable space for the arch, clearance to other fork parts, clearance to bike model, clearance to tire model, and the like.

For example, there can be size and design differences based on whether the fork arch 100 metal, composite, or the like. That is, each different material will likely incur a different shape, thickness, and the like, to achieve the requisite stiffness and stress thresholds for the fork arch 100. For example, composite material would have a minimum weight and shape requirement to meet the stiffness and stress thresholds, while Aluminum would have another weight and shape requirement to meet the stiffness and stress thresholds, Magnesium would have yet another given weight and shape requirement to meet the stiffness and stress thresholds, etc.

In one embodiment, fork arch 100 would include a number of different sizes, geometries, and shapes to cover a number of marketing scenarios, as each fork arch 100 would have a material cost and a manufacturing cost (e.g., milled, extruded, 3D printed, cast, formed, etc.). For example, the absolute lightest fork arch 100 could be formed from a material such as graphene gyroid. While the manufacturing costs could make it prohibitive for mass production, a professional team and/or the like would utilize such a fork arch 100. In contrast, an aluminum fork arch 100 would have a price point based on the manufacture and materials cost that would put it in a lower cost bracket, while a magnesium fork arch 100 might be in a medium cost bracket.

In one embodiment, the fork arch 100 shape, thickness, one or more material removal regions 406 and the like, would be different for different categories such as a road bike, gravel bike, mountain bike, e-bike, and the like. As the different categories would have different torsion and/or transverse stiffness and stress thresholds. Moreover, within any given category there can be different travel settings (e.g., solid frame, hardtail, full suspension, etc.), wheel sizes, rim sizes, brake types, clearances, and the like.

For example, a fork arch 100 for a mountain bike might have fewer or no material removal regions 406 as the weight reduction would not be as high of a priority as durability, stiffness, endurance, or the like.

In contrast, a fork arch 100 for a road bike would have many material removal regions 406 as the weight reduction would be of a higher priority than any increase in stiffness, durability, endurance, or the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A suspension, comprising:

a first upper tube telescopically engaged with a first lower tube;

a second upper tube telescopically engaged with a second lower tube;

a fork arch connecting the first lower tube with the second lower tube, wherein the fork arch comprises at least one portion having an aspect ratio that is greater than one, wherein the at least one portion is selected from a group consisting of a torsional geometry portion and a transverse geometry portion, and wherein the aspect ratio of the other of said torsional geometry portion or said transverse geometry portion is less than one; and at least one material removal region that is located in a location selected from a group consisting of said torsional geometry portion, said transverse geometry portion, and a combination of said torsional geometry portion and said transverse geometry portion.

2. The suspension of claim 1, wherein the aspect ratio is a depth-to-width ratio.

3. The suspension of claim 1, wherein at least a portion of the torsional geometry portion extends in a longitudinal direction of a bicycle.

4. The suspension of claim 1, wherein the fork arch has a depth and a width that are variable along the length of the fork arch.

5. The suspension of claim 1, wherein said at least one material removal region is selected from at least one member of the group consisting of: an opening, a thinning without an opening, a depression without an opening, a protrusion without an opening, and a groove without an opening.

6. The suspension of claim 1, wherein at least one portion of a torsional geometry portion has a depth that is greater than a depth of at least one portion of a transverse geometry portion.

7. The suspension of claim 1, wherein a first leg portion of the torsional geometry is asymmetrical with a second leg portion of the torsional geometry.

8. A suspension component, comprising:

a first lower tube;

a second lower tube; and a fork arch connecting the first lower tube with the second lower tube, wherein the fork arch comprises a torsional geometry portion and a transverse geometry portion, wherein a majority of the torsional geometry portion has a depth-to-width ratio that is greater than one.

9. The suspension component of claim 8, further comprising at least one material removal region that is located in a location selected from a group consisting of said torsional geometry portion, said transverse geometry portion, and a combination of said torsional geometry portion and said transverse geometry portion.

10. The suspension component of claim 9, wherein said at least one material removal region is selected from at least one member of the group consisting of: an opening, a thinning without an opening, a depression without an opening, a protrusion without an opening, and a groove without an opening.

* * * * *